United States Patent [19]

Doniat et al.

[11] Patent Number: 5,324,333
[45] Date of Patent: Jun. 28, 1994

[54] CADMIUM OXIDE ELECTRODE WITH BINDING AGENT

[75] Inventors: Denis Doniat, Le Perreux; Bernard Bugnet, Champs Sur Marne, both of France

[73] Assignee: Sorapec, Societe de Recherche et d'Applications Electrochimiques, Fontenay Sous Bois, France

[21] Appl. No.: 949,272

[22] Filed: Sep. 11, 1992

Related U.S. Application Data

[60] Division of Ser. No. 855,162, Mar. 20, 1992, abandoned, which is a continuation of Ser. No. 649,285, Jan. 30, 1991, abandoned, which is a continuation of Ser. No. 499,203, Mar. 23, 1990, abandoned, which is a continuation of Ser. No. 394,311, Aug. 14, 1989, abandoned, which is a continuation of Ser. No. 268,677, Nov. 7, 1988, abandoned, which is a continuation of Ser. No. 82,113, Aug. 6, 1987, abandoned, which is a continuation of Ser. No. 822,685, Jan. 23, 1986, abandoned, which is a continuation of Ser. No. 686,717, Dec. 27, 1984, abandoned.

[51] Int. Cl.$^5$ .............................................. H01M 4/26
[52] U.S. Cl. .................................. 29/623.5; 429/217; 429/222
[58] Field of Search ...................... 429/217, 222, 235; 29/623.5

[56] References Cited

U.S. PATENT DOCUMENTS

| | | | |
|---|---|---|---|
| 3,837,919 | 9/1974 | Gutridge | 429/222 X |
| 4,172,184 | 10/1979 | Bloom et al. | 429/222 X |
| 4,206,271 | 6/1980 | Norling et al. | 429/223 X |
| 4,251,603 | 2/1981 | Matsumoto et al. | 429/235 X |
| 4,396,693 | 8/1983 | Bernstein et al. | 429/217 |
| 4,414,303 | 11/1983 | Williamson et al. | 429/222 X |
| 4,900,114 | 2/1990 | Mortimore et al. | |

OTHER PUBLICATIONS

Electronics Letters, vol. 24, No. 8, Apr. 14, 1988, pp. 500–501, Modal Field Transforming Quartz Single-Mode Fibre, S. Tammela et al.

*Primary Examiner*—Stephen Kalafut
*Attorney, Agent, or Firm*—Felfe & Lynch

[57] ABSTRACT

A plasticized cadmium oxide electrode for an electrochemical generator and more specifically for a storage battery is formed by pasting a reticulated open-porosity matrix, a plasticizing agent being associated with cadmium oxide in the paste employed. This electrode has high capacity and offers outstanding stability during cycling.

7 Claims, No Drawings

CADMIUM OXIDE ELECTRODE WITH BINDING AGENT

This is a division of application Ser. No. 855,162 filed on Mar. 20, 1992. Application No. 855,162 is a continuation of application Ser. No. 649,285 filed on Jan. 30, 1991, which was a continuation of application No. 499,203, filed on Mar. 23, 1990, which was a continuation of application Ser. No. 394,311 filed on Aug. 14, 1989, which was a continuation of application Ser. No. 268,677 filed on Nov. 7, 1988, which was a continuation of Ser. No. 082,113 filed on Aug. 6, 1987, which was a continuation of Ser. No. 822,685 filed on Jan. 23, 1986, which was a continuation of Ser. No. 686,717 filed on Dec. 27, 1984, all now abandoned.

BACKGROUND OF THE INVENTION

1. Field of the Invention

The present invention relates to electrodes for electrochemical generators and is more specifically concerned with a cadmium oxide electrode for storage batteries.

2. Description of the Prior Art

Very different and numerous routes have already been explored for many years with a view to developing new electrode designs which are conducive to higher performances. In this field, research has primarily been directed to a reduction in weight of collectors, to enhanced retention of active materials and to an increase in their electrochemical efficiency by establishment of better charge collection. The use of porous collectors has thus led to the achievement of substantial progress in comparison with techniques of the prior art, initially by making use of sintered metal structures and then, more recently, by obtaining and employing fibrous or reticulated metallized structures having an open-pore volume which can attain and even exceed 90%.

DETAILED DESCRIPTION OF THE INVENTION

The invention which forms the subject of this patent relates to a cadmium electrode in which the collector is a high-porosity metallic structure.

The metallic substrate which is preferably employed for the purpose of forming both the charge collector and the matrix for retaining the active material is a cellular reticulated structure or network forming a juxtaposed array of cellular spaces and having an open porosity which exceeds 95%.

This "metallic foam" is advantageously formed by at least a surface layer of nickel. Since this structure is usually obtained by means of one or a number of metal deposits formed on a polyether or polyester foam, the thickness of the deposit or deposits is advantageously of the order of 5 to 20 $\mu$m. The mean pore diameter is preferably within the range of 0.3 mm to, 1 mm and more particularly in the vicinity of 0.7 to 0.8 mm. In regard to the thickness of said substrate, this thickness is chosen as a function of the intended use of the cadmium electrode thus produced. In particular, the substrate thickness differs according to whether it is intended to be wound in a spiral or not, or else incorporated in small or large-size storage batteries. Said thickness can also be determined in consideration of the operating conditions and desired electrochemical performances. In the majority of instances, the substrate thickness will be within the range of 0.5 to 3 mm and preferably 1 to 2 mm.

A collector as defined earlier of two millimeters in thickness has a mass of approximately 50 mg per square centimeter of apparent surface area. The ratio of real surface area to apparent surface area is in the vicinity of 5.

The active material of the electrode, or cadmium oxide, is introduced into the interior of the collector (which also has the function of forming a retention matrix) in the form of paste.

This paste is obtained by association of the active material proper and a plasticizing agent to which a consistency agent may be added if necessary.

In accordance with the invention, it is proposed to add to the cadmium oxide a binding agent which preferably consists of Teflon (PTFE). This binding agent is advantageously introduced in the form of an aqueous suspension having a concentration of approximately 60%. The proportion of Teflon to cadmium oxide is preferably within the range of 2 to 4% by weight; a value of 3% can be more generally adopted. An alcohol diluent is then added to the mixture and can consist, for example, of ethanol which may be of denatured quality. At the time of preparation of the paste, the optimum ratio of alcohol to cadmium oxide is approximately 80 ml of alcohol for 100 g of CdO. The presence of a binding agent, has the effect of producing within the active mass a fibrillation which endows it with enhanced mechanical strength characteristics. This binding agent has the effect of reducing the fragility which arises from the friable nature of the active material and this latter thus acquires a certain degree of flexibility.

Finally, in order to ensure easy positioning of the active mass within the reticulated collecting matrix, it is useful to introduce a consistency agent during preparation of the mix. The function of the consistency agent is to obtain an unctuous consistency which is intended to satisfy the conditions of the pasting operation. The consistency agent under consideration is preferably methylcellulose which can advantageously be introduced into the active mass in a proportion of approximately 1% by weight with respect to the cadmium oxide.

Pasting of the reticulated metallic structure is then carried out either by hand or by means of an industrial device. Depending on the thickness of the support and the dimension of its pores, the pasting operation is preferably performed in one or two passes. In the case of a two-pass pasting operation, it is an advantage to introduce the paste through one face in the first pass and then through the other face in the second pass.

In order to ensure optimum formation of the electrode in accordance with the invention, it is useful to carry out a number of additional operations after the pasting operation.

Thus in an operation which immediately follows the pasting process, it is an advantage to subject the electrode to low-pressure calendering by means of rubber-covered rollers, for example.

Drying is then advisable in order to remove the water and alcohol contained in the active mass. Care should be taken to ensure that the drying operation is not carried out too abruptly since this would be liable to result in crack formation within the mass. This requirement makes it necessary to perform the drying step at a low temperature which is preferably not higher than 100° C.

It is particularly advantageous, in the next step of the present invention, to carry out an operation which consists in "doping" the electrode with nickel. This nickel-doping operation is performed by immersion of the electrode in a nickel nitrate solution, the optimum concentration of which is in the vicinity of 50 g/liter. The immersion time is preferably of the order of one minute, during which impregnation of the electrode takes place.

The object of the doping operation is to endow the cadmium electrode formed in accordance with the invention with higher electrochemical stability during cycling. In point of fact, if this doping operation is not performed, electrode drift can be observed after a few tens of cycles and the capacity of the electrode then progressively decreases. When the electrode has been subjected to doping with nickel, it can then withstand several thousand charge-discharge cycles without any impairment of its capacity.

After this step of the fabrication process, it is useful to carry out a second drying operation under conditions similar to those which have already been mentioned earlier in connection with the first drying operation.

A final advantageous step in accordance with the invention consists in subjecting the electrode to a compacting operation. There are two basic reasons for this operation. In the first place, by permitting a reduction in thickness of the electrode, it permits an increase in ohmic capacity by means of a simple mechanical operation. In addition, compacting has the effect of consolidating the electrode which thus acquires higher mechanical strength. This compacting operation is preferably performed at a pressure of approximately 200 kg/cm$^2$ of apparent surface area, with the result that the thickness of the electrode can be reduced by half.

A cadmium electrode fabricated in accordance with the invention and subjected to a preparation process which includes all the steps defined in the foregoing offers a volume capacity of approximately 700 Ah/liter and a mass capacity of approximately 250 Ah/kg. An electrode of this type does not exhibit any loss of capacity after 1000 charge-discharge cycles in C/2 at a discharge depth of 80%.

As is wholly apparent from the foregoing, the invention is not limited to the examples hereinabove described but extends to all alternative forms.

What is claimed is:

1. Method of fabricating an electrode, comprising
   providing a charge collector consisting of an open celled structure having 95% porosity,
   providing an active mass paste comprising a mixture of cadmium oxide and fibrillated PTFE, said PTFE being present in a proportion of 2 to 4% by weight with respect to the weight of the cadmium oxide, and
   pasting said active mass paste into the charge collector so that the open cells are completely filled.

2. A method according to claim 1 wherein the active mass paste additionally comprises ethanol.

3. A method according to claim 1 further comprising the steps of calendering and drying the electrode, doping said electrode with nickel by immersion or impregnation in a nickel nitrate solution, then subjecting said electrode to a further drying operation, and finally compacting said electrode into a reduced thickness.

4. A method according to claim 3 wherein the electrode is doped with nickel by impregnation with a nickel nitrate solution over a period of approximately one minute.

5. A method according to claim 1 wherein the cellular reticulated matrix is formed by at least a surface layer of nickel having a thickness of from 0.5 to 3 mm, the mean pore diameter of matrix being within the range of from 0.3 to 1 mm.

6. A method according to claim 1 wherein the active mass paste is produced from a mixture of cadmium and an aqueous suspension of PTFE having a concentration of approximately 60%.

7. A method according to claim 6 wherein the active mass paste additionally comprises methylcellulose in an amount of approximately 1% with respect to the weight of the cadmium oxide, and ethanol in an amount of approximately 80 ml per 100 g of cadmium oxide.

* * * * *